United States Patent

[11] 3,529,533

| [72] | Inventor | Harold A. De Remer, Allentown, Pennsylvania |
|---|---|---|
| [21] | Appl. No. | 811,327 |
| [22] | Filed | March 28, 1969 |
| [45] | Patented | Sept. 22, 1970 |
| [73] | Assignee | General Electric Company, a corporation of New York |

[54] ELECTRIC TOASTER CARRIAGE DAMPING CONSTRUCTION
4 Claims, 7 Drawing Figs.

[52] U.S. Cl. .................................................... 99/327, 99/335, 99/391
[51] Int. Cl. ..................................................... A47j 37/08
[50] Field of Search ........................................ 99/327, 329, 391, 334, 335, 336

[56] References Cited
UNITED STATES PATENTS

| 2,319,997 | 5/1943 | Ireland | 99/391 |
| 2,653,533 | 9/1953 | Weeks | 99/391 |
| 2,680,403 | 6/1954 | Savela et al. | 99/329 |
| 2,863,377 | 12/1958 | Huck | 99/329 |

*Primary Examiner*—Billy J. Wilhite
*Attorneys*—Lawrence R. Kempton, Leonard J. Platt, John F. Cullen, Frank L. Neuhauser, Oscar B. Waddell and Melvin M. Goldenberg ABSTRACT: An electric toaster construction wherein a flywheel member is arranged to damp acceleration of a toaster bread carriage so that bread or other food being toasted will not be thrown out of the toaster at the end of the toasting cycle.

Patented Sept. 22, 1970

Inventor:
Harold A. DeRemer
by Leonard J. Platt
Attorney

Patented Sept. 22, 1970

Inventor:
Harold A. DeRemer
by Leonard Platt
Attorney

Patented Sept. 22, 1970

Inventor:
Harold A. De Remer
by *Leonard Platt*
Attorney

[3,529,533]

ELECTRIC TOASTER CARRIAGE DAMPING CONSTRUCTION

BACKGROUND OF THE INVENTION

This invention relates to an electric toaster, and more particularly, to an improved arrangement for damping acceleration of a toaster bread carriage.

Electric pop-up style toasters conventionally include a vertically reciprocal bread carriage which is manually lowered to move slices of bread or other food to be toasted to a toasting position. Timing means is provided to release the toaster bread carriage upon completion of the toasting operation, and a return spring is provided for raising the toaster carriage and the bread or other food which has been toasted so that the food may be readily removed from the toaster. Toasters of this type have included flywheels and other energy absorbing devices to damp upward acceleration of the carriage at the end of the toasting cycle so as to prevent bread or other food from being thrown out of the toaster. While these damping devices have been constructed and assembled in a number of different ways on an electric toaster, it is especially desirable that they not only control upward acceleration of the bread carriage but also that they do not retard upward movement of the bread carriage to such an extent that the carriage is prevented from reaching its uppermost position. It is also desirable to provide a toaster carriage damping construction which may be manufactured at relatively low cost. It is most important therefore to reduce to a minimum the number of parts required and the number of operations required to assemble the parts to each other.

SUMMARY OF THE INVENTION

Accordingly, it is a primary object of this invention to provide an improved, reliable toaster carriage damping construction having a minimum number of parts which may be readily manufactured and assembled.

It is also a particular object of the invention to provide a bread carriage damping construction which insures full movement of the bread carriage to its uppermost position.

To accomplish these objects in one form, I have positioned a vertical member adjacent to the toaster carriage and have provided an inertial flywheel which is supported for rotation on the carriage. An axle is fixed to the inertial flywheel and a friction tire which is arranged for engagement with the generally vertical member is fixed to the axle. With this construction, when the timing device releases the carriage for upward movement at the end of the toasting cycle, the rubber tire rolls on the generally vertical member so that the flywheel is caused to rotate and some of the energy of the return spring is imparted to the flywheel to damp acceleration of the carriage. The speed of the inertial flywheel increases as the flywheel and carriage are raised from their lower toasting position to their upper position. When the carriage has reached its upper position, the flywheel and the axle and tire which are affixed thereto will continue to spin so that the tire will slide on the generally vertical member. This spinning movement of the flywheel and sliding movement of the tire imparts additional upward force to the carriage thereby insuring that the carriage will be returned to its uppermost position.

BRIEF DESCRIPTION OF THE DRAWINGS

Other objects and attendant advantages of the invention will be apparent from the following description taken in connection with the accompanying drawing in which.

DESCRIPTION OF THE PREFERRED EMBODIMENT

Figure 1:
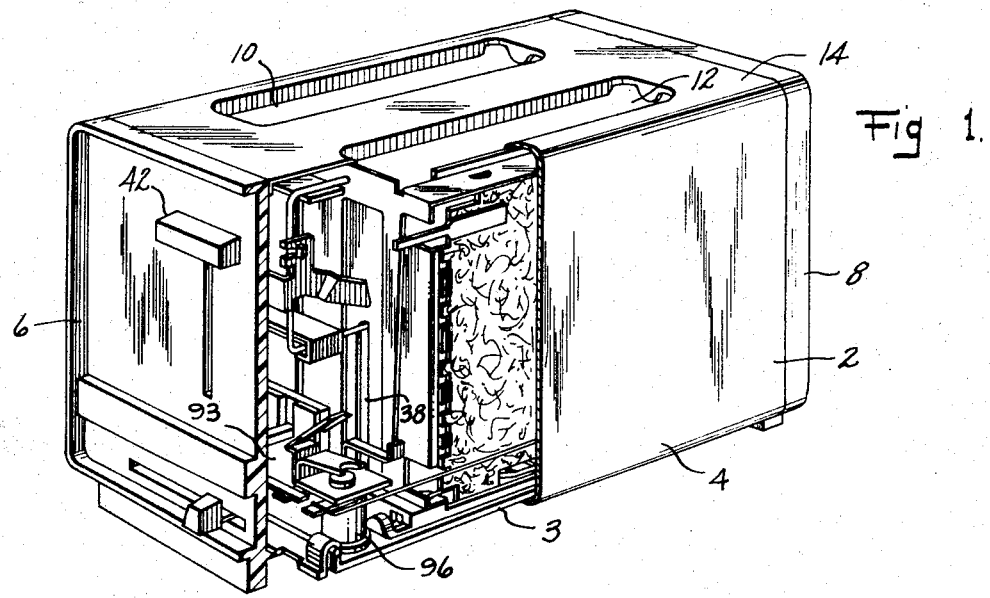
FIG. 1 is a perspective view of an electric toaster construction embodying my improved inertial damping system partly broken away to show details in construction.

Referring now to the drawing and first particularly to FIG. 1, there is shown an electric toaster 2 which includes an inner supporting structure 3, an outer cover 4 and spaced generally vertical end walls 6 and 8. Bread receiving slots 10, 12 are formed in a top wall 14 of the outer casing.

Toasting chambers 16 and 17 are generally defined by opposed bread guard and heater card sub-assemblies 18—19 and 20—21, respectively, which guide and toast slices of bread or other food.

Figure 2:
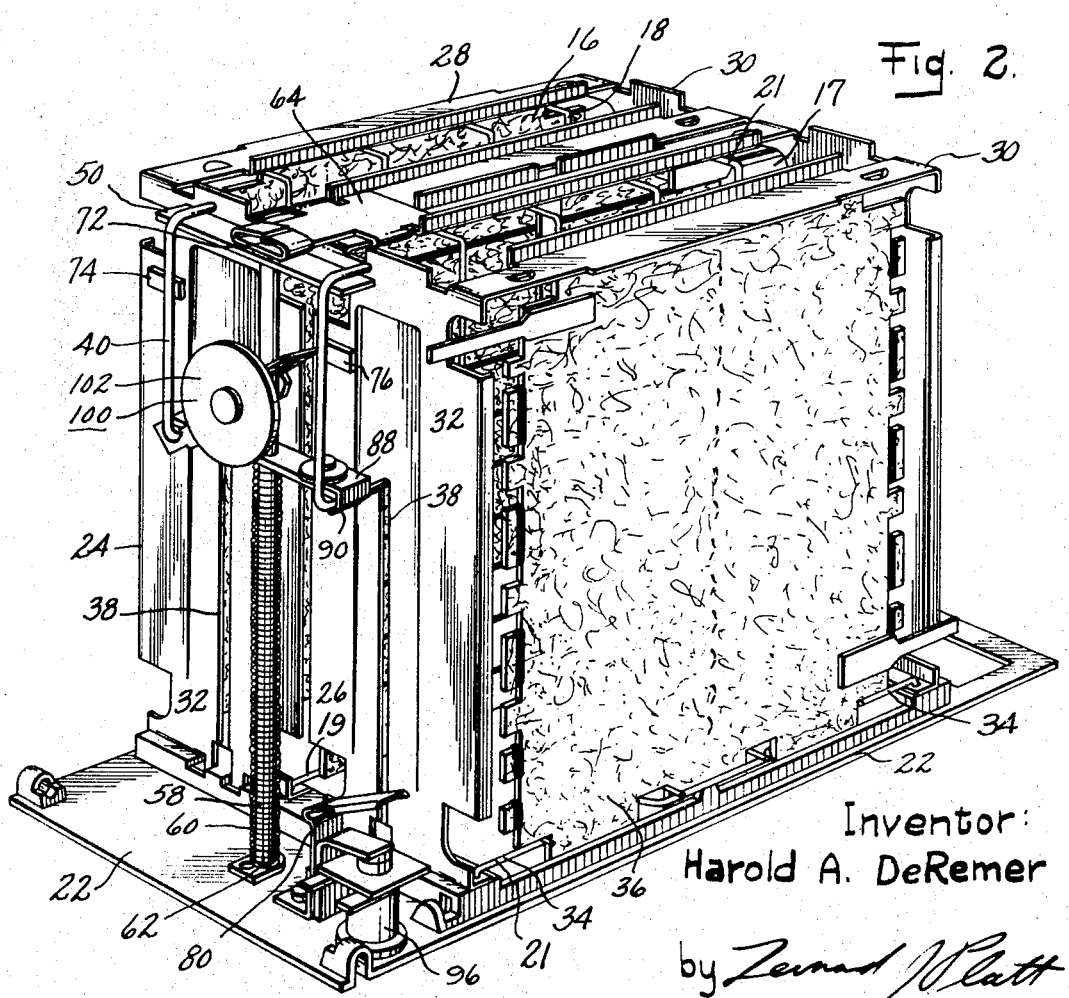
FIG. 2 is a perspective view of an electric toaster shown in FIG. 1 with the outer casing removed to show construction details.

A relatively rigid base plate 22 is provided for supporting one, two, three or more heater frame modules and as shown in FIG. 2, the base plate 22 supports two heater frame modules 24 and 26. The base plate is preferably formed as a casting of aluminum or other suitable metal.

As shown more particularly in FIG. 2, each of the heater frames 24 and 26 include a top wall 28 and integrally formed depending side walls 30 and 32. The frames are preferably formed of sheet metal or other suitable flexible material which may be readily bent and formed to the desired shape. The heater frame sub-assemblies 24 and 26 also conveniently support wire bread guards 34 and electric resistance wire heater cards 36 for positioning and toasting a slice of bread or other food. Elongated slots 38 are formed in the side walls 30 and 32 of the heater frame modules for receiving a bread carriage assembly 40.

As shown more particularly in FIG. 1, the bread carriage 40 is movable vertically in the toasting chamber 16 and 17 by means of an actuator lever 42 as is conventional in "pop-up" style toasters. As shown more particularly in FIG. 6, the bread carriage 40 may be readily and inexpensively formed from three wires 44, 46 and 48 and two sheet metal plates 50 and 52. The central portions 54 and 56 of the wires 44 and 46 are bent back and forth for providing a platform to support a slice of bread or other food while it is being toasted. A single wire 48 is connected to the ends of the wires 44 and 46 for connecting the wires to each other to form a rigid assembly. At the left side of the toaster, as shown in FIG. 6, both of the wires extend upwardly and then inwardly and two sheet metal plates 50 and 52 are connected to generally horizontal portions 47 and 49 of the wires.

A carriage slide rod 58 is provided for guiding the toaster carriage 40 as it is lowered by the manually actuable lever 42, and as it is raised by a spring 60 at the end of the toasting cycle. The carriage slide rod 58 is securely held on the toaster by an aperture 62 which is formed in the base plate 22, and a bracket 64 which is connected to the upper portion of the heater frame modules 28 and 30.

Figure 6:
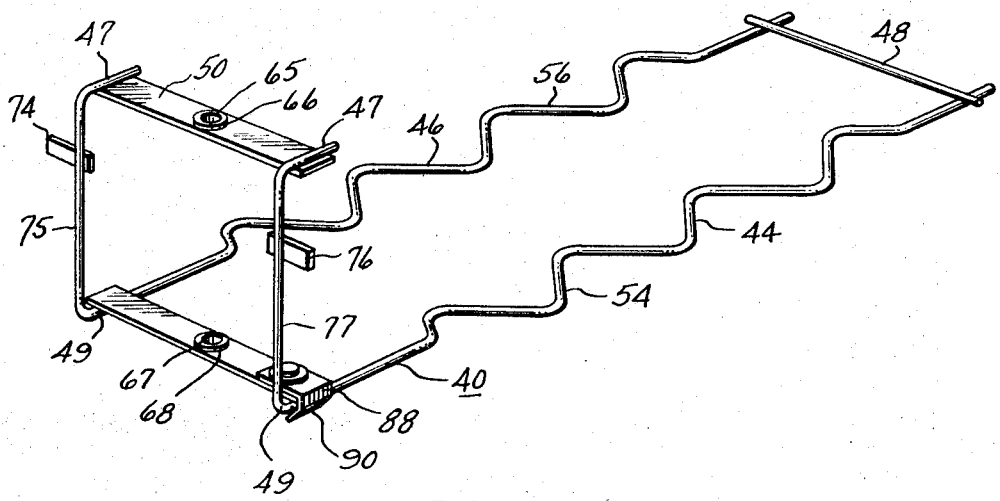
FIG. 6 is a perspective view of the electric toaster bread carriage.
Figure 7:
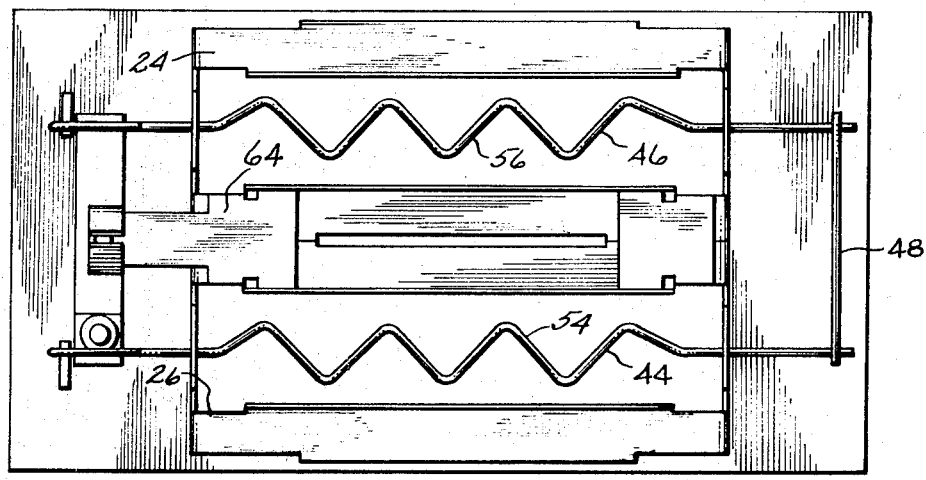
FIG. 7 is a top plan view of the electric toaster shown in FIG. 1 with the outer casing removed to show construction details.

With particular reference to FIG. 2 and FIG. 6, the arrangement for mounting the toaster carriage 40 on the toaster will now be more particularly described. Circular apertures 66 and 68 are formed in sheet metal plates 50 and 52, respectively, and bushings 65 and 67 formed of nylon or similar material are positioned within the aperture. A coil spring 60 is positioned over the slide rod and the lower end of the carriage slide rod 58 is inserted within aperture 62 in the base plate. The slide rod is passed through the apertures 66 and 68 and bushings 65 and 67 and the upper portion of the slide rod is passed through an aperture 72 which is formed in bracket 64. It can be seen that the return spring 60 is positioned between the base plate 22 of the toaster and the lower metal plate 52 of the toaster bread carriage. Thus, the spring 60 may hold the toaster bread carriage in its upper or non-toasting position illustrated in FIG. 2. Arms 74 and 76 are provided on vertical portions 75 and 77 of wires 44 and 46 of the toaster bread carriage for connecting the manually movable lever 42 to the bread carriage.

Figure 3:
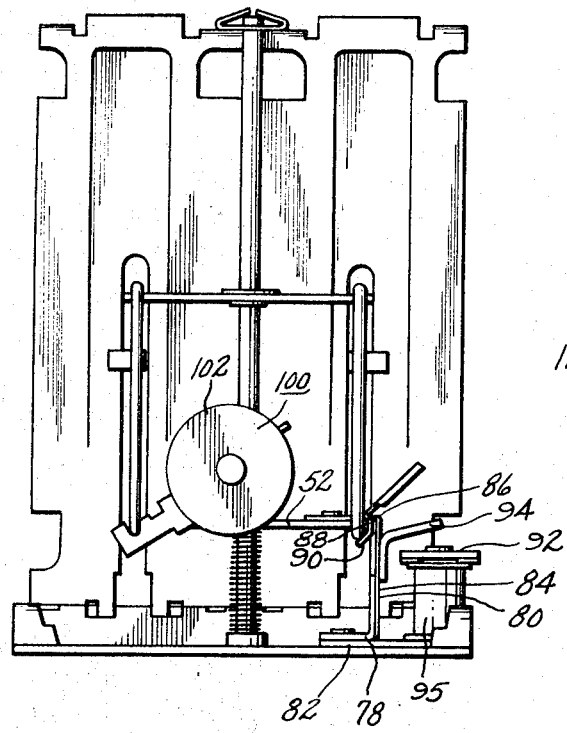
FIG. 3 is a side elevational view of the electric toaster shown in FIG. 2 with the toaster bread carriage in its lower toasting position.

When it is desired to toast a slice of bread, the manually movable lever 42 is depressed from the position shown in FIG. 2 thereby lowering the carriage against the force of spring 60; and when the carriage reaches the position illustrated in FIG. 3, a latch mechanism 78 holds the carriage in its lower toasting position.

As shown more particularly in FIGS. 2 and 3, the latch mechanism 78 includes a sheet metal leaf spring 80 which is riveted or otherwise secured to the base plate 22 of the toaster. The leaf spring 80 includes a generally horizontal arm 82 which is riveted to the base plate, a generally vertical portion 84 and an inwardly extending latch projection 86 for cooperating with the toaster carriage plate 52. In order to reduce friction between latch projection 86 and the metal plate 52 and to provide a guiding surface for the latch projection 86, a piece of plastic insulating material 88 is riveted to metal plate 52. As shown more particularly in FIG. 3, the piece of insulation is generally "L" shaped and includes an angular guide portion 90. With this construction, when the toaster bread carriage has been moved to its lower position illustrated in FIG. 3, the natural bias of latch spring 80 causes the latch projection 86 of the spring to move on top of the insulated piece 88 thereby holding the carriage in its lower toasting position.

In the embodiment illustrated, a toaster timer 93 energizes a solenoid 96 at the end of the toasting cycle to release the latch 80 and permit the toaster carriage 40 to be moved upwardly to its bread removal position illustrated in FIG. 1. As shown in FIG. 3, an "L" shaped piece of sheet metal 94 is welded to the spring latch 80 and at the end of the toasting cycle when the solenoid 96 is energized, the metal 94 is pulled down on top of the solenoid 96 to move the latch to the position illustrated in FIG. 2 thereby permitting the carriage 44 to move to the upper position.

In accordance with my invention, a unique flywheel damping device 100 is provided for damping acceleration of the carriage from the position illustrated in FIG. 3 to the position illustrated in FIG. 2 at the end of the toasting cycle. This construction includes only a few components, an inertial flywheel 102, an axle 104 fixed to the flywheel and a rubber tire or sleeve 106 fixed to and positioned over the axle, and a readily formed metal bracket or pivoted support arm 108 for holding the flywheel device 100 on the bread carriage 44.

Figure 5:
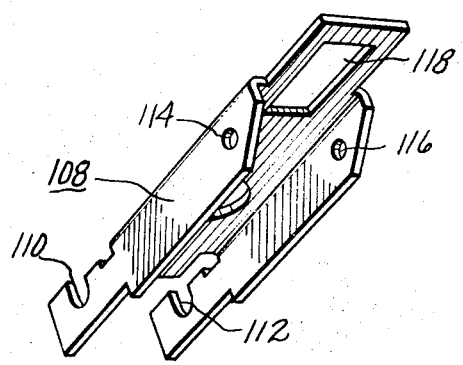
FIG. 5 is a perspective view of the inertial wheel support arm.
Figure 4:
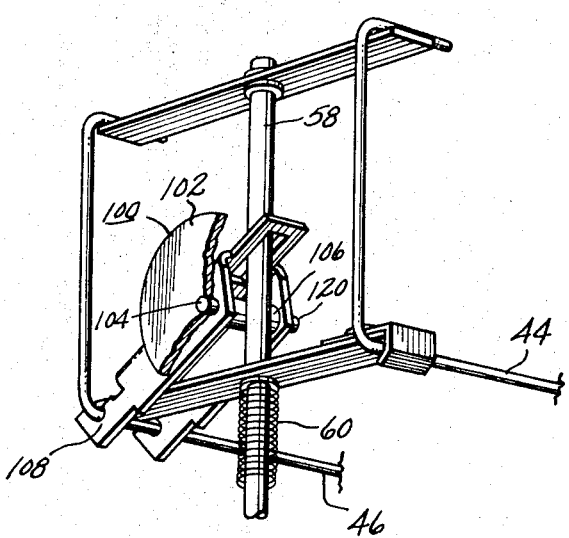
FIG. 4 is a side perspective view of the electric toaster carriage assembly with the inertial wheel partially broken away to show details in construction.

The pivoted support arm 108 consists of a piece of sheet metal which is stamped and shaped in the form illustrated in FIG. 5. Slots 110 and 112 are formed in the rear portion of the bracket for pivoting the bracket about the generally horizontal carriage wire 46. Apertures 114 and 116 are formed in the bracket for receiving the flywheel axle 104, and a generally rectangular slot 118 is formed in the bracket for permitting the bracket to be passed over the carriage slide rod 58. With this arrangement, it can be appreciated that the pivoted support arm 108 may be readily connected to the bread carriage by simply placing the arm over the lower metal plate 52 and placing the bread carriage wire 46 within slots 110 and 112. When the carriage slide rod 58 is passed through bushings 66 and 68, the slide rod 58 is also passed through the rectangular aperture 118 which is formed in the pivoted support arm 108. The flywheel axle 104 may be simply riveted to the flywheel 102, and the rubber tire 106 which is preferably formed of silicone rubber may be stretched over or otherwise securely fixed to the axle 104. The assembly of the flywheel on the pivoted support arm 108 may be completed by deforming end 120 of the axle after the axle has been passed through apertures 114 and 116.

In accordance with my invention, the pivoted support arm 108 is arranged to be placed at an angle of approximately 30° with respect to the lower mental plate 52 of the toaster carriage. With this angular arrangement, when the carriage 40 is pushed down, the bracket 108 tends to pivot about the carriage wire 46 and the silicone rubber tire 106 slides down the slide rod 58. This allows the carriage to be pushed down fast without restriction and because of the low force on the tire, the wear on the down stroke is minimized. The flywheel usually does not turn at all on the downstroke. When the carriage is released by latch 86 at the end of the toasting cycle, the angle of the pivoted support arm 108 is such that the friction of the tire 106 against the slide rod causes the rubber tire to roll along the slide rod thereby imparting torque to the axle of the flywheel and causing the flywheel to rotate. The carriage then travels upward at an almost constant acceleration.

It can be appreciated that with this construction when the carriage has reached its upper position, the flywheel 102 and the axle and tire which are fixed to the flywheel will continue to spin so that the tire 106 will pull on the carriage slide rod 60 thereby causing the pivoted support arm 108 to exert an upward pull on wire 46 of the bread carriage. Thus, the spinning flywheel 102 rubbing the tire 106 on the slide rod 58 imparts an additional upward force to the carriage thereby insuring that the carriage is returned to its upper position at the end of the toasting cycle. This additional upward force also makes possible the lifting of extra heavy loads.

From the foregoing description, it will be appreciated that a reliable, effective toaster carriage damping system has been achieved. In some prior art carriage mechanisms, the friction forces due to heat cycling and mechanical wear increased to the point where the carriage might not come all the way up to the top of its travel. With applicant's simplified flywheel inertial damping system, when the toaster carriage reaches its upper position the spinning flywheel provides an extra force to lift the carriage. Moreover, applicant's device does not include any gears which could become fouled by pieces of bread, grease and other material which could find its way to the toaster mechanism.

It will also be appreciated that my improved toaster damping system includes a minimum number of relatively easily manufactured parts. The pivoted support arm 108 may be stamped and formed in a simple manufacturing operation. Likewise, the inertial wheel 102 may be readily rotationally mounted on the pivoted bracket 108. Thus, an exceedingly simple, yet sturdily constructed toaster damping device has been achieved.

I claim:
1. An electric toaster construction comprising:
 a. a toaster bread carriage movable toward and away from a toasting position;
 b. a spring for urging said carriage from said toasting position;
 c. a timing device for determining the toasting time period including a device for releasing said carriage at the end of said time period to permit the carriage and the food which is being toasted to be moved away from said toasting position under the force of said spring;
 d. a generally vertical member positioned adjacent to said toaster carriage;
 e. an inertial flywheel supported for rotation on said carriage;
 f. an axle fixed to said flywheel for causing rotation thereof; and
 g. a friction tire fixed to said axle and arranged for engagement with said generally vertical member so that when said timing device releases said carriage for upward movement under the force of said spring said rubber tire frictionally engages and rolls on said generally vertical member to cause rotational movement of said flywheel whereby some of the energy of the spring is imparted to the flywheel to damp acceleration of the carriage.
2. An electric toaster construction as defined in claim 1 wherein a bracket is pivoted to said toaster carriage and said inertial flywheel is mounted for rotation on said bracket.

3. An electric toaster construction as defined in claim 2 wherein said bracket includes a pair of slots for readily connecting said bracket to said toaster carriage.

4. An electric toaster construction comprising:
 a. a rigid base plate;
 b. a toaster bread carriage movable toward and away from a toasting position, said toaster bread carriage including a pair of guide bushing apertures formed therein and a generally horizontal bread wire;
 c. a spring for urging said carriage from said toasting position;
 d. a timing device for determining the toasting time period including a device for releasing said carriage at the end of said time period to permit the carriage and the food which is being toasted to be moved away from said toasting position under the force of said spring;
 e. a generally vertical slide rod mounted on said base member extending through said guide bushing apertures;
 f. a bracket pivotally mounted on said bread wire;
 g. an inertial flywheel supported for rotation on said bracket;
 h. an axle fixed to said flywheel for causing rotation thereof; and
 i. a friction tire fixed to said axle and arranged for engagement with said slide rod so that when said timing device releases said carriage for upward movement under the force of said spring said rubber tire frictionally engages and rolls on said slide rod to cause rotational movement of said flywheel whereby the flywheel damps acceleration of the carriage and continues to spin when the carriage reaches its upper position thereby insuring that the carriage is returned to its upper position.